March 7, 1939.  R. D. SCHNOOR  2,149,633
DRAFT APPARATUS
Filed March 30, 1936   3 Sheets-Sheet 2
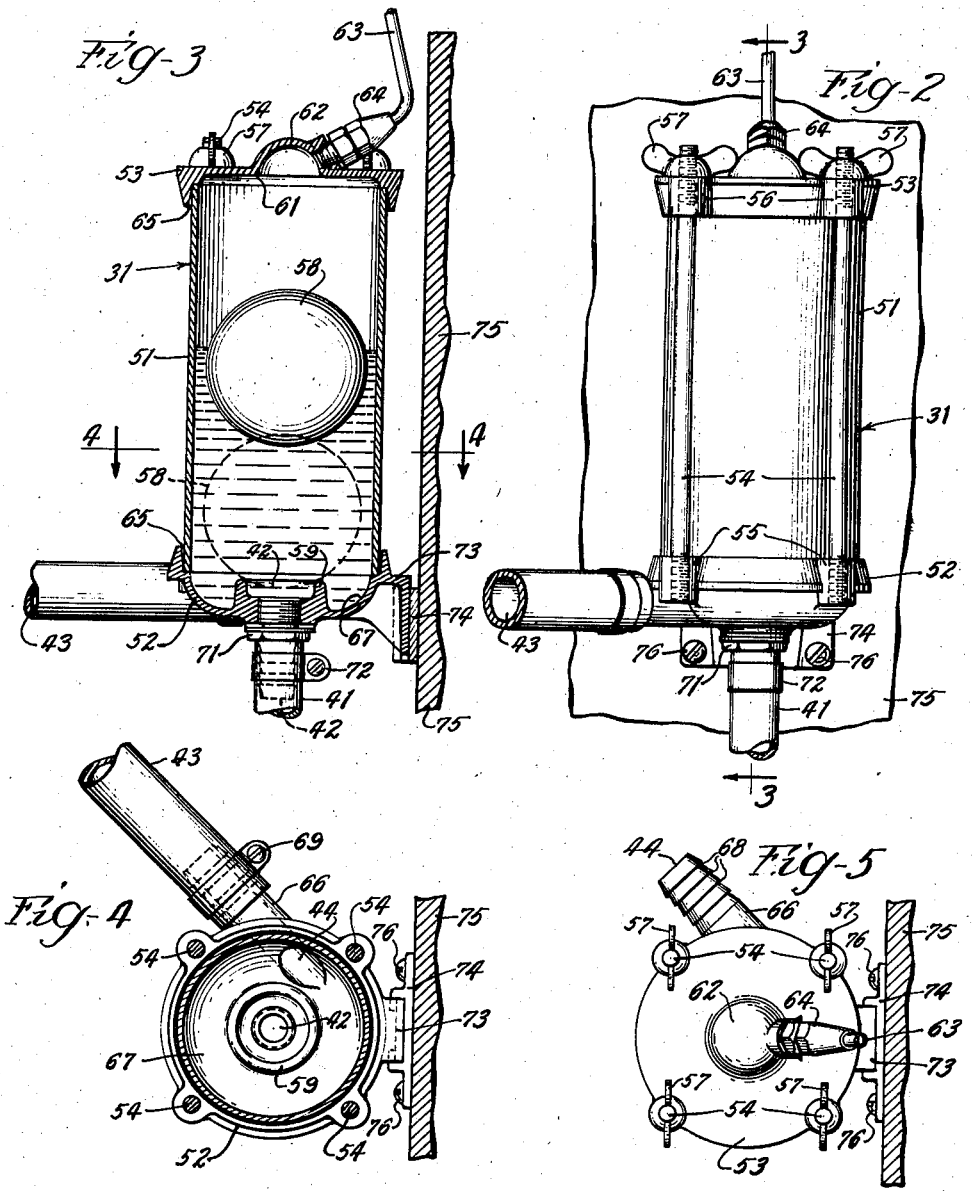
Inventor.
Raymond D. Schnoor March 7, 1939. R. D. SCHNOOR 2,149,633
DRAFT APPARATUS
Filed March 30, 1936 3 Sheets-Sheet 3
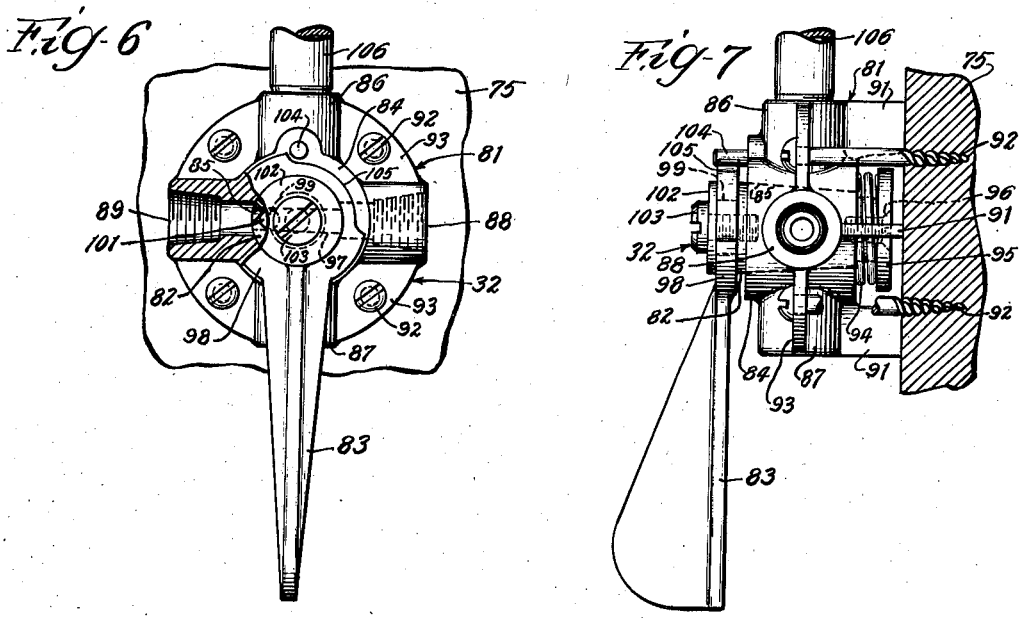
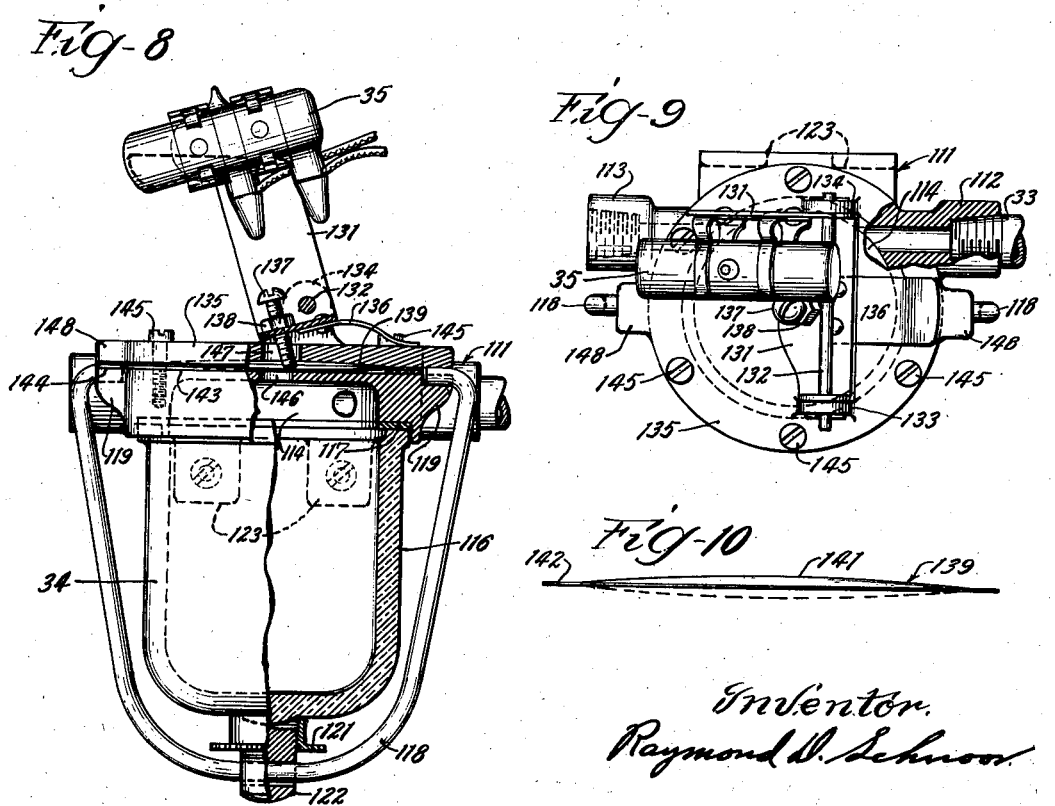
Inventor.
Raymond D. Schnoor Patented Mar. 7, 1939

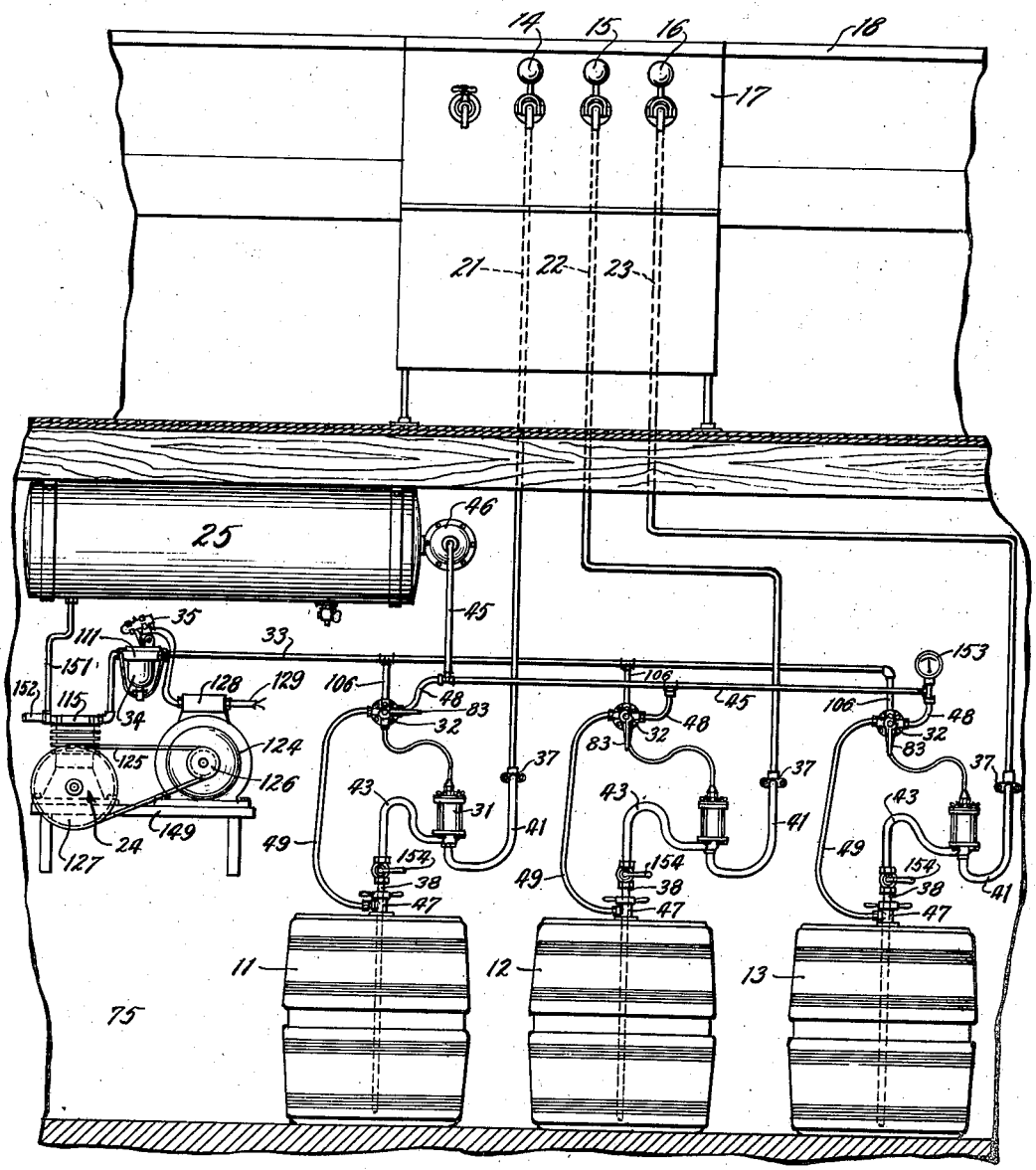

2,149,633

UNITED STATES PATENT OFFICE 2,149,633

DRAFT APPARATUS

Raymond D. Schnoor, Chicago, Ill.

Application March 30, 1936, Serial No. 71,573

20 Claims. (Cl. 225—1)

This invention relates in general to draft apparatus, for discharging liquid from containers, such as beverages and the like, and more particularly to the combination therewith of subsequently operable apparatus whereby the fluid used for exhausting or discharging the contents of containers may be salvaged or recovered for repeated use.

It is an object of this invention to provide such an apparatus for accomplishing this purpose so that a draft system may be started with carbon dioxide gas, pure air, or any other suitable pressure fluid and will thereafter require at most an occasional addition of pressure fluid to compensate for slight losses due to mechanical imperfections, and when used for discharging beverages charged with carbonic gas, practically no addition of gas will be required because some quantity of gas is (normally) liberated from the liquid in each container exhausted.

In present draft systems the pressure fluid is discharged into the atmosphere or remains in the container when same is disconnected from draft. When carbonic or carbon dioxide gas is used this system is wasteful and expensive and where atmospheric air is used it is unsanitary and deteriorating to carbonated beverages such as beer or the like. In contact with such a beverage atmospheric air has the effect of liberating gas therefrom and atmospheric bacteria develops in the beverage rendering the beverage distasteful and unfit for consumption if the container contents are not promptly disposed of.

Other objects of the invention, such as the novel means for determining when the container is empty, the means for exhausting the container or salvaging the pressure fluid, the control of operation of the compressor, the economy of construction and the efficiency of operation will be apparent as the invention is better understood from the following description, which taken in connection with the accompanying drawings discloses an embodiment thereof.

Referring to the drawings:

Figure 1 is a sectional elevation showing an installation of draft apparatus embodying my invention.

Fig. 2 is an enlarged elevational view of an important part of the apparatus shown in Figure 1.

Fig. 3 is a vertical sectional view taken substantially on line 3—3 in Fig. 2 and showing details of construction.

Fig. 4 is a similar horizontal section taken substantially on line 4—4 in Fig. 3, illustrating a means for effecting a rotary liquid motion.

Fig. 5 is a plan view of the device as shown in Fig. 3.

Fig. 6 is an enlarged elevational view of the fluid line control device shown in Figure 1 and partly broken away to illustrate details of construction.

Fig. 7 is a side elevational view, viewing Fig. 6 from the right and illustrating details of construction.

Fig. 8 is an enlarged elevational view of a line trap and compressor control switch as shown in Fig. 1, broken away in part to show details of construction.

Fig. 9 is a similar plan view of the device shown in Fig. 8 and

Fig. 10 is an enlarged view of a diaphragm as shown in Fig. 8.

To illustrate my invention I have shown containers 11, 12 and 13, (Figure 1), outlets 14, 15 and 16, mounted on a cooling box 17, of a bar 18 located on the floor above the compartment for the containers 11, 12 and 13. Conduits 21, 22 and 23, connect the containers 11, 12 and 13, respectively, with the outlets 14, 15 and 16, and a source of fluid pressure supply including a compressor unit 24 and storage tank 25, all of which may be of any suitable or standard form and construction and in addition thereto apparatus embodying my invention operably associated therewith including a body 31, and a fluid control device 32, operably associated with each one of the containers 11, 12 and 13, a return line 33, connecting all of the control devices 32 with the compressor 24 through a line trap 34, and a compressor control switch 35 operably associated with the line trap 34.

In the usual and ordinary installations of draft apparatus the flow lines 21, 22 and 23 are formed of block tin from or between wall fittings 37 and the respective outlets including cooling coils (not shown) arranged in the coil box 17, and of rubber hose from the wall fittings 37 to tap rods 38 or similar connectors whereby the flow line is connected to containers to be discharged. This rubber hose portion being flexible facilitates the tapping operation and in accordance with my invention may be retained but is divided. A part 41 thereof is connected to the wall fitting 37 at one end and to an outlet opening 42 of the body 31 at the other end, and a part 43 thereof is connected at one end to the tap rod 38 and to an inlet opening 44 of the body 31 at the other end thereof, thus forming a complete flow line from the tap rod 38 to the respective outlet of each one of the containers 11, 12 and 13, through one of the bodies 31.

Fluid under pressure in the storage tank 25 is conveyed through a pressure line 45, subject to the action of a suitable reduction valve 46, to points adjacent each one of the containers 11, 12 and 13 and is then conducted to tap rod bushings 47, through flexible tubes, which in the present instance are divided. A part 48 thereof is connected at one end thereof to the pressure line 45 and at the other end thereof to the line control device 32, and a part 49 thereof connected at one end to the line control device 32 and to the tap rod bushing 47 at the other end thereof completes the pressure connection for each one of the containers 11, 12 and 13 subject to operation of the control device 32.

The body 31, (Figs. 1 to 5) is substantially a line trap or valve for trapping gaseous fluid from liquid flowing in the line by gravitational displacement and operates to stop the flow of liquid in the line when no more liquid flows from the container. In the present embodiment the body 31 includes a cylindrical sleeve 51, rigidly secured between a base part 52, and a top part 53, by means of bolts 54 having threaded engagement in lugs 55 formed on the base part 52 and extending through corresponding lugs 56 formed on the top part 53 to receive wing nuts 57. To provide a means for stopping flow in the liquid line beyond the body 31 after the container is exhausted a buoyant spherical stopper 58, such as a hollow or sponge type ball formed of soft rubber or the like, is arranged in the body 31 to normally float above an annular seat 59 as shown in Fig. 3 and to engage the annular seat 59, formed in the base part 52, when the liquid level within the body 31 recedes as shown by the dotted line position of the ball 58 in Fig. 3.

A similar annular seat 61 is formed in the top part 53 by offsetting the material thereof to form a dome 62, and the stopper 58 rises to engage this seat when the level of liquid in the body 31 rises too high. Gaseous fluid such as carbon dioxide, air or the like, is drawn from the body 31 through a tube 63, connected by means of a suitable fitting 64 to and having threaded engagement with the dome portion 62 of the top part 53, and similarly connected to the line control device 32, as will be later described.

Tapered annular sockets 65 are formed in opposed relationship in the base part 52 and in the top part 53 of the body 31 into which the respective ends of the sleeve 51 are wedged by means of the wing nuts 57 and the bolts 54, to form a separable sealed joint.

To render the body 31 self cleaning the liquid inlet channel 44 is arranged in substantially horizontal relationship and to impart a whirling or spinning motion to liquid as an incident to the passage thereof through the body 31. In the present embodiment this channel is formed in a tubular extension 66, extending tangentially with respect to and communicating with an annular socket 67, extending about the seat 59 in the base part 52. A plurality of annular grooves 68, are or may be formed in the periphery of the tubular sleeve to facilitate the attachment thereto of the end of the tube 43, which may be suitably secured thereto by means of a suitable hose clamp 69.

A male hose connector 71 of suitable design having threaded engagement with the base part 52 and communicating with the interior thereof within the annular seat 59 and to which the end of the tube 41 may be secured by means of a hose clamp 72 or the like, provides an outlet connection in which a suitable check valve may be arranged when required.

To provide a means for supporting the body 31, I have shown a wedge shaped lug 73, formed on the base part 52 and extending therefrom to engage in a correspondingly shaped socket formed in a wall bracket 74, which may be suitably attached to a wall 75, such as by means of screws 76, or the like, for detachably supporting the body 31 thereon.

The fluid line control device 32 in the present embodiment is substantially a double or line crossing spigot valve and includes a valve body 81, arranged to be secured against the wall 75 in any suitable manner, a spigot or valve plug 82, and an operating handle 83. Obviously two one-way valves may be substituted therefor but coordinated action is positive and extra operations are eliminated by a single cross valve.

The valve body 81 includes a substantially cylindrical portion 84, through which a tapered bore 85 extends longitudinally, and laterally extending lugs 86, 87, 88 and 89, internally tapped to receive pipe threaded fittings and arranged substantially ninety degrees apart about the body portion 84 intermediate the ends thereof and in axially aligned pairs The body portion 84 is transversely bored in axial alignment with both pairs of lugs to form ports or flow channels communicating with the tapered bore 85 in opposed relationship. Legs 91 extend from each one of the lugs 86, 87, 88 and 89, to space the valve body 81 from the wall 75 and the body is secured to the wall 75 by means of screws 92, extending through apertured webs 93 and engaging the wall 75. The webs 93 are formed integral with the body 81 and extend between the lugs 86, 87, 88 and 89.

The spigot or valve plug 82 includes a plug, tapered and lapped to fit the bore 85 and extending beyond the bore 85 to locate a compression spring 94, arranged and acting between the valve body 81 and a cap 95, which is secured to the spigot or plug 82 by means of a screw 96, or the like, to tightly seat the plug 82. A transverse bore 97, extending through the plug 82 establishes communication between lugs 86 and 87 or lugs 88 and 89 when in alignment with the bore in either pair thereof.

The handle 83 may be any suitable operating device having a head 98, which may be apertured to receive a stem 99, extending from the plug 82, and is keyed to the plug in fixed relationship by means of a pin 101, imbedded partly in the head 98 and partly in the stem 99. The handle and plug are secured against relative axial movement by a cover washer 102, and a screw 103, which also prevent axial movement of the pin 101.

A stop pin 104, mounted in the body 81 and extending into a slot 105 formed in the head 98 of the handle 83, limits the movement of the handle to requirements.

As above described, one line control device 32 is provided for each container and its associated lines and a terminal 106 of the return line 33 is connected to the lug 86 of the body 81 before it is secured to the wall 75. The tube 63 extending from the body 31 is operably connected to the lug 87 which is oppositely disposed with respect to the lug 86, and the parts 48 and 49 of the tube connection to the pressure line 45 are connected by means of suitable connecting devices to the lugs 88 and 89, respectively, of the body 81.

It will be noted that fluid flow is permitted in either the pressure line or in the suction or return line but not simultaneously in both lines and that the fluid flow is controlled by positioning the handle 83 to align the bore 97 in accordance with requirements.

In exhausting gaseous fluid from the body 31 it is possible that some liquid may collect in the return line 33 and to eliminate this the line trap 34 is provided. In the present embodiment this device includes, a body 111 having laterally extending threaded bosses 112 and 113, apertured to communicate with a chamber 114 therein, to which the return line 33 may be connected for communication with the chamber 114 and a head 115 of the compressor 24, as shown (Figs. 1, 8 and 9).

A glass receptacle 116, is detachably connected to the body 111 and seated against a yieldable gasket 117, by means of a swing 118, engaging socketed lugs 119, formed on the body 111 and carrying a relatively adjustable threaded stem 121, and companion stem 122.

The receptacle 116 extends the volume of the chamber 114 and collects liquid from the line 33, and may be removed for emptying by turning the sleeve 121 down on the stem 122 and moving the swing 118 from beneath the receptacle.

Lugs 123 formed on the body 111, provide a means for securing the body against the wall 75 or another suitable support.

The compressor 24 is arranged to be driven by an electric motor 124 through a belt 125, extending about a pulley 126, carried on the drive shaft of and driven by the motor 124, and a driven pulley 127 mounted to actuate the compressor mechanism, and in order to coordinate operation of the compressor 24 with operation of any one of the control devices 32 connected to the return line 33, the compressor control switch 35 which is electrically connected through a terminal box 128 to a power line 129, and to the motor 124, is mounted for actuation or control in response to changes in pressure in the return line 33. The switch 35, illustrated (Figs. 8 and 9) is of the mercoid or mercury type in which electrical contact is established or broken by tilting the switch and is suitably attached to a bracket 131, which is pivotally supported on a shaft 132, having bearings in lugs 133 and 134, formed on a plate 135, and engages the lugs 133 and 134 to limit axial movement therebetween.

A leaf spring 136, which is suitably secured to the bracket 131 by means of rivets or the like, and engages the plate 135, urges the bracket 131 in a counter clockwise direction (Fig. 8) and an adjusting screw 137, having threaded engagement in the bracket 131 and provided with a lock nut 138, is eccentrically located with respect to the axis of the shaft 132 and moves the bracket 131 carrying the switch 35 in a clockwise direction in response to movement of a diaphragm 139, (Figs. 8 and 10).

The diaphragm 139 is preferably formed of a relatively thin disc of sheet metal such as bronze, a central portion 141 of which is die crowned in accordance with the thickness thereof and so that the crowned portion will not pass the plane of a rim, portion 142, thereof to the position indicated by dotted lines (Fig. 10) or pass that plane again in returning to its original position without a considerable change in pressure, acting in either direction.

The diaphragm 139 is arranged over a top surface 143 on the body 111 and spaced therefrom by a suitable annular gasket 144 of sufficient thickness to permit full movement of the diaphragm and is rigidly secured thereto by means of the cover plate 135 and a plurality of screws 145 extending through the cover, diaphragm and gasket and having threaded engagement in the body 111. The inner surface of the cover plate 135 is preferably concave in form to permit the required flexing of the diaphragm and to reinforce the diaphragm after the required movement is completed. An aperture 146, extending between the surface 143 and the chamber 114 in the body 111, establishes communication between the diaphragm and the flow line 33 so that the diaphragm will respond to changes in pressure in said line and the adjusting screw 137 engages the diaphragm through an aperture 147.

Lugs 148, formed on the cover plate 135 and arranged over the lugs 119 formed on the body 111, secure the swing 118 in operative relationship.

The compressor 24 and motor 124 therefor may be mounted on a suitable shelf 149, secured to the wall 75 or may be positioned in any convenient or remote location. A suitable pipe line 151, connects the compressor 24 to the tank 25 and a suitable relief valve 152, may be provided to vent excess gases.

A suitable pressure gauge 153, may be connected into the pressure line 45 for indicating the working pressure of the line.

For convenience of illustration, I have shown an old and well known tap apparatus including the tap bushing 47 which is first connected to a container and through which the tap rod 38 is inserted into the container and secured. A valve 154 mounted on the tap rod is closed during the tapping operation and opened thereafter to permit flow from the container but it is obvious that any other tap devices will function with the above described apparatus in a like manner.

Flow lines 22 and 23 are illustrated in operation, with the control devices set to connect the pressure line 45 through to the containers 12 and 13 as above described to cause a flow of liquid from the container 12 and through the line 22 upon the opening of the outlet valve 15 and similarly in the line 23 upon the opening of the outlet valve 16.

When the liquid contents of the container in any line is exhausted some of the pressure fluid will flow up the tap rod and into the body 31, displacing the liquid content thereof until the stopper 58 engages the annular seat 59 and stops further flow of liquid in the associated line and consequently at the outlet thereof. This action is an effective signal indicating to an operator that a new container is required on the line and the operator then closes the outlet valve and moves the handle 83 of the corresponding line control device 32 into a horizontal position as illustrated in connection with flow line 21 and container 11.

This operation cuts off the pressure line 45 from the container and connects the return line 33 through the body 31 and tap rod 38 with the interior of the container and admits the exhausting pressure to the return line 33 and consequently to the chamber 114 of the line trap 34 and through the aperture 146 to the diaphragm 139, causing the diaphragm to expand and tilt the switch 35 into a substantially horizontal or contacting position, energizing the motor 124 to operate the compressor 24 which, by its operation extracts or exhausts the pressure fluid contents of the container and returns the fluid through the line 151 to the storage tank 25 for further or repeated use. When the pressure in the return line 33 is reduced by operation of the compressor and sufficiently to cause the diaphragm to snap back to the position shown (Fig. 8), operation of the compressor is stopped by the tilting of the switch 35 to open the motor circuit.

A proper curvature for the diaphragm which will effect closing of the switch 35 under a plus gauge pressure of approximately five pounds and the opening thereof under a minus gauge pressure of ten to fifteen pounds, may be determined by trial or any other suitable switch mechanism capable of accomplishing this purpose, may be substituted for the mechanism illustrated.

While the pressure fluid is being exhausted from a container as above described the operator is or may be occupied in bringing up a new or full container into position to be tapped and when the exhausting operation is completed the tap rod valve 154 is closed and the tap rod 38 and bushing 47 are removed and applied to the new container in the usual manner. Pressure is then applied to the new container by operation of the line control device 32 as above described and upon the opening of the tap rod valve 154, liquid again flows in the line raising the stopper 58 in the partially evacuated body 31, well above the seat 59 where it will not interfere with liquid flow to the outlet until the contents of the container is discharged.

The system may be charged with carbon dioxide gas by evacuation and displacement or by placing dry ice in the receptacle 116 or directly into the storage tank 25 and it will be noted that in some instances when carbonated liquids are discharged from containers the system may be started on air and will in a short time absorb gas from the liquid in the containers and will automatically become a gas system, after a short period of operation.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. A draft apparatus for exhausting liquid containers comprising, a container connected by a conduit to a remote outlet, means to direct fluid under pressure to exhaust the contents of the container by displacement, a body connected into the conduit and provided with means responsive to conditions indicating a discharged container whereby the flow of liquid in said conduit and toward the remote outlet is shut off at said body when liquid flow into the body from the container has terminated, and means having an operable connection with said body and being operable to render said first mentioned means inoperative and to extract and compress fluid whereby the fluid used for exhausting the container is salvaged for reuse in said first mentioned means.

2. A draft apparatus for exhausting liquid containers comprising, means for connecting a container to a remotely located outlet including a conduit, means to direct gaseous material under pressure from a source of supply to the container for discharging the liquid contents thereof through said conduit by displacement, a body connected into said conduit and forming a part thereof and being provided with means responsive to conditions normally indicating a discharged container for stopping liquid flow at the remote outlet when liquid flow from the container has terminated, shut off means operable to cut off the supply of gaseous material to the container, and means communicating with the container and being operable to effect the extraction of gaseous material used for discharging the container therefrom and to return it to the source of supply for reuse in discharging other containers.

3. A draft apparatus for exhausting liquid containers comprising, means for connecting a container to a remotely located outlet including a conduit, means to direct gaseous material under pressure from a source of supply to the container for discharging the liquid contents thereof through said conduit by displacement, a body connected into said conduit and forming a part thereof and being adapted to prevent the flow of gaseous material toward said remote outlet and provided with means responsive to conditions normally indicating a discharged container for stopping liquid flow at the remote outlet when liquid flow from the container has terminated, shut off means operable to cut off the supply of gaseous material to the container, and means communicating with the container and being operable to effect the extraction of gaseous material used for discharging the container therefrom and to return it to the source of supply for reuse in discharging other containers.

4. A draft apparatus for exhausting liquid containers comprising, means for connecting a container to a remotely located outlet including a conduit, means to direct gaseous material under pressure from a source of supply to the container for discharging the liquid contents thereof through said conduit by displacement, a body connected into said conduit and forming a part thereof and being provided with means responsive to conditions normally indicating discharge for indicating a discharged container at the remote outlet when liquid flow from the container has terminated, shut off means operable to cut off the supply of gaseous material to the container, and means communicating with the container and being operable to effect the extraction of gaseous material used for discharging the container therefrom and to return it to the source of supply for reuse in discharging other containers.

5. The combination with draft apparatus, including a container, an outlet, conduit means connecting and forming a flow line between the container and the outlet, and pressure means including tubes forming a pressure line and connecting the container to a source of gas under pressure whereby liquid may be discharged from the container by displacement, of a hollow body connected into the flow line adjacent the container and provided with means for restricting flow in said line beyond the body to a liquid flow, and means having an operative connection with said body and the source of supply and being operable for recovering the gas used for displacing the liquid content of said container whereby the gas may be recovered and returned to the source of supply.

6. For association with a draft apparatus in which said apparatus comprises a container and means connecting the container with a source of gas pressure supply for discharging the liquid contents of the container by displacing the liquid with gas under pressure and discharging it through a conduit to an outlet, means for determining when the liquid is discharged from the container and for stopping the flow of liquid toward the outlet thereafter, and means operatively connected to and communicating with the conduit between said last named means and the container adapted for operation to extract gas from the container and to return the extracted gas to its source.

7. For association with a draft apparatus in which said apparatus comprises a container and means connecting the container with a source of gas pressure supply for discharging the liquid contents of the container by displacing the liquid with gas under pressure and discharging it through a conduit to an outlet, means for determining when the liquid is discharged from the container and for stopping the flow of liquid toward the outlet thereafter, and means including a tube communicating with the conduit between said last named means and the container and pump means adapted for operation to extract gas from the container and being connected to return the gas to the pressure supply source whereby the gas used for discharging the liquid content of the container may be salvaged for augmenting the pressure supply thereof.

8. The combination with draft apparatus including a container, an outlet, conduit means connecting and forming a flow line between the container and the outlet, and pressure means including tubes forming a pressure line and connecting the container to a source of fluid under pressure whereby liquid may be discharged from the container by displacement, of a body connected into the flow line for preventing the flow of fluid toward said outlet and provided with shut-off means operable under predetermined conditions to stop the flow of liquid in said line beyond said body, and exhausting means operably connected to said body whereby fluid may be exhausted from the container after the liquid is discharged therefrom.

9. The combination with draft apparatus, including a container, an outlet, conduit means connecting and forming a flow line between the container and the outlet, and pressure means including tubes forming a pressure line and connecting the container to a source of fluid under pressure whereby liquid may be discharged from the container by displacement, of a hollow body connected into the flow line having inlet and outlet openings for liquid and another opening, and means operably connected to the last mentioned opening including a pump device whereby fluid may be exhausted from the container upon occasion.

10. The combination with draft apparatus, including a container, an outlet, conduit means connecting and forming a flow line between the container and the outlet, a periodically operable compressor having a storage tank associated therewith, and tubes forming a pressure line connected to said storage tank and to the container through which fluid is conducted to the container for discharging the liquid contents thereof, of a hollow body connected into the flow line having inlet and outlet openings for liquid and another opening, said last mentioned opening being conductively connected to the compressor intake, and means controlling flow from said opening and in the pressure line to facilitate operation thereof.

11. The combination with draft apparatus, including a container, an outlet, conduit means connecting and forming a flow line between the container and the outlet, a periodically operable compressor having a storage tank associated therewith, and tubes forming a pressure line connected to said storage tank and to the container through which fluid is conducted to the container for discharging the liquid content thereof, of a hollow body connected into the flow line having inlet and outlet openings for liquid and another opening, said last mentioned opening being conductively connected to the compressor intake, and control means therefor, including a compressor control device and cut-off means controlling fluid flow through said last mentioned opening and the pressure line.

12. The combination with draft apparatus, including a container, an outlet, conduit means connecting and forming a flow line between the container and the outlet, a periodically operable compressor having a storage tank associated therewith, and tubes forming a pressure line connected to said storage tank and to the container through which fluid is conducted to the container for discharging the liquid contents thereof, of a hollow body connected into the flow line having inlet and outlet openings for liquid and another opening, said last mentioned opening being conductively connected to the compressor intake, and control means therefor including cut-off means controlling fluid flow through said last mentioned opening and the pressure line and being operable to cut off flow through either one or the other thereof.

13. The combination with draft apparatus, including a container, an outlet, conduit means connecting and forming a flow line between the container and the outlet, a periodically operable compressor having a storage tank associated therewith, and tubes forming a pressure line connected to said storage tank and to the container through which fluid is conducted to the container for discharging the liquid contents thereof, of a hollow body connected into the flow line having inlet and outlet openings for liquid and another opening, said last mentioned opening being conductively connected to the compressor intake, and control means therefor including cut-off means controlling fluid flow through said last mentioned opening and the pressure line and being operable to cut-off flow through either one or the other thereof, and a compressor control device operably connected to control operation of the compressor and to respond to an adjustment of the cut-off means for starting the compressor.

14. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of stop means including a gas trap and being operatively connected to stop the flow of liquid in said conducting means after a predetermined volume of gas discharged through the inlet opening in said tap device has accumulated in the gas trap, and means operatively connected to said first named means and being operable after operation of said stop means for exhausting the gas under pressure from said container through the inlet opening in said tap device.

15. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of stop means including a gas trap and being operatively connected to stop the flow of liquid in said conducting means after a predetermined volume of gas discharged through the inlet opening in said tap device has accumulated in the gas trap, means operatively connected to said first named means and being operable after operation of said stop means for exhausting the gas under pressure from said container through the inlet opening in said tap device, and means responsive to manual operation adapted to control said last named means whereby the operation of exhausting a discharged container may be effectively controlled.

16. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of stop means including a gas trap and being operatively connected to stop the flow of liquid in said conducting means after a predetermined volume of gas discharged through the inlet opening in said tap device has accumulated in the gas trap, means operatively connected to said first named means and being operable after operation of said stop mean for exhausting the gas under pressure from said container through the inlet opening in said tap device, and a remotely located means responsive to manual operation and adapted to effect operation of said last named means for exhausting the container.

17. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of a body operatively associated with said conducting means and being provided with stop means for preventing the flow of liquid toward said remote outlet after a predetermined quantity of gas has escaped through the inlet opening of said tap device and is contained in the body, and means operatively connected to said body and being operable after operation of said stop means to exhaust the gas under pressure from said container through the inlet opening in said tap device.

18. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of a body operatively associated with said conducting means and being provided with stop means for preventing the flow of liquid toward said remote outlet after a predetermined quantity of gas has escaped through the inlet opening of said tap device and is contained in the body, means operatively connected to said body and being operable after operation of said stop means to exhaust the gas under pressure from said container through the inlet opening in said tap device, and means responsive to manual operation adapted to control said last named means whereby the operation of exhausting a discharged container may be effectively controlled.

19. In a draft apparatus of the character wherein the liquid contents of a container is discharged through a remotely located outlet by displacing the contents of the container with gas under pressure and is conducted from the container to said outlet by means including a tap device operatively connected to and having an inlet opening communicating with the interior of the container and conducting means connecting the tap device and said remote outlet, the combination with said first mentioned means, of a body operatively associated with said conducting means and being provided with stop means for preventing the flow of liquid toward said remote outlet after a predetermined quantity of gas has escaped through the inlet opening of said tap device and is contained in the body, and means communicating with the inlet opening in said tap device and being operable to exhaust gas under pressure from the container after operation of said stop means.

20. The combination with draft apparatus, including a container, an outlet, conduit means connecting and forming a flow line between the container and the outlet, and pressure means including tubes forming a pressure line and connecting the container to a source of fluid under pressure whereby liquid may be discharged from the container by displacement, of a hollow body connected into the flow line adjacent the container and provided with means for restricting flow in said line beyond the body to a liquid flow, a portion of said body having a horizontally disposed inlet channel and an outlet channel angularly disposed with respect thereto and substantially centrally disposed with respect to an end of the body, whereby a spinning movement is imparted to liquid contained in the body as an incident to the flow of liquid therethrough.

RAYMOND D. SCHNOOR.